C. P. HATFIELD.
HARNESS SHAFT TUG.
APPLICATION FILED OCT. 1, 1907.
902,964.
Patented Nov. 3, 1908.
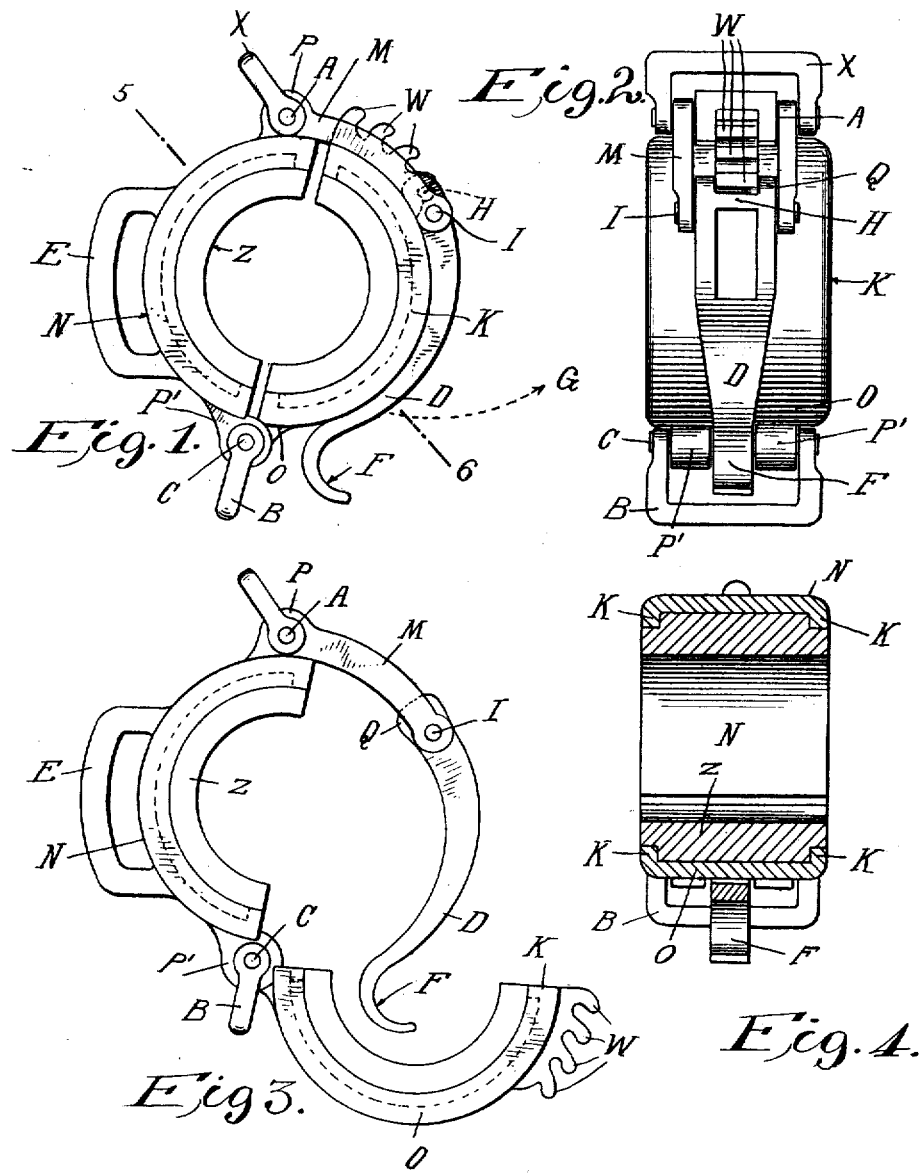

UNITED STATES PATENT OFFICE.

CHESTER P. HATFIELD, OF LEBANON, OHIO.

HARNESS SHAFT-TUG.

No. 902,964.    Specification of Letters Patent.    Patented Nov. 3, 1908.

Application filed October 1, 1907. Serial No. 395,361.

*To all whom it may concern:*

Be it known that I, CHESTER P. HATFIELD, a citizen of the United States, residing at Lebanon, in the county of Warren and State of Ohio, have invented certain new and useful Improvements in Harness Shaft-Tugs, of which the following is a specification, reference being had to the accompanying drawings.

My invention relates to improvements in that part of the harness of a horse which is commonly known as a shaft tug or thill holder; and an object of my invention is to provide a shaft tug which will be nonslipable and stationary on the shaft, thereby saving the latter from wear.

Another object of my invention is to provide a shaft tug which may be opened and which will obviate the necessity of passing the end of the shaft through the tug, whereby time in hitching the horse is saved.

A third object of my invention is to provide a shaft tug with devices to which the holdback strap may be connected, whereby time is saved in hitching the horse; and, further, since the shaft tug grips the shaft tightly, it will prevent the vehicle from crowding against the buttocks of the horse, in the event of the breaking of a holdback strap while going down-hill. In the event of the breaking of a trace or whiffle-tree, the horse is prevented from leaving the shafts by the firm grip of the shaft tugs upon the shafts.

A further object of my invention is to provide a shaft tug of the character just described which will prove simple in construction, comparatively cheap in manufacture and efficient in use.

In the drawings illustrating the principle of my invention and the best mode now known to me of applying that principle, Figure 1 is an end view and Fig. 2 a side view of my new shaft tug; Fig. 3 is an end elevation showing the tug opened; and Fig. 4 is a section on the line 5—6 of Fig. 1.

The body portion of the shaft tug is made up of two curved plates or bands N, O which are substantially semicircular in shape and are formed with the inwardly-projecting flanges K for holding in place the rubber lining Z. Instead of the rubber, any other resilient frictional material may be used, the object of the lining being to afford a firm grip on the shaft and thereby to hold the tug N, O, securely in place and to save the shaft from that wear which results from the slipping of the leather tugs or loops now so commonly in use. The curved plate N is formed with a laterally-extending eye E through which is passed the holdback strap (not shown). It is further formed with the bosses P, P', which lie on opposite sides of the center of the shaft tug. Through the boss P extends a hinge-pin A upon the ends of which is pivotally mounted a D-shaped loop X through which is passed a strap from the backband of the harness (not shown), whereby the shaft tug is suspended. The latter is prevented from rising by passing a strap from the bellyband (not shown) through the D-shaped loop B pivotally mounted on the ends of the hinge-pin C which extends through the two-part boss P'. The hinge-pin C connects the curved plates N, O together.

Pivotally mounted upon the upper hinge-pin A at each end thereof is one end of a link M the other end of which supports an end of the pin I; and upon the latter is mounted free to swing a locking lever or latch D the free end F of which is curved to afford a suitable grip, and the upper end of which is formed with the ears Q between which lies the nose H. The latter is adapted to engage the teeth W formed on the upper free end of the curved band O.

When it is desired to open the shaft tug, the plates N, O are unclasped by seizing the latch D by the grip F and drawing the latter outwardly in the direction of the arrows G, Fig. 1. By the cam action of the ears Q, the nose H of the latch D is disengaged from the teeth W of the plate O, thereby releasing the latter and allowing it to swing downwardly upon the hinge-pin C, as is indicated by Fig. 2.

The shaft tug being opened, the shaft or thill of the vehicle is placed in the hollow of the curved plate N and the coöperating plate O is then brought up against the shaft. The two plates are clasped together by engaging the nose H of the latch D with the nearest tooth W and then forcing the latch H at its free end F towards the shaft tug. The teeth W provide for different sizes of shaft or thill. The resilient lining Z saves the shaft from marring and wear due to rubbing of the shaft by the tug, by affording a firm hold upon the shaft so that there is no relative motion between the latter and the tug. Should a trace break or the whiffle-tree become detached, the shaft tugs will still hold the shafts and haul the vehicle. Thus, accidents are avoided. Further, should the holdback strap break, the shaft tug by reason of its grip on the shaft would prevent the vehicle from striking the buttocks or rump of the horse. Time is saved in hitching the horse by reason of the holdback straps being attached to the shaft tugs and by reason of the driver being able to attach the tug and the shaft together without passing the end of the shaft through the tug.

I claim:

1. A tug consisting of a pair of curved plates, one of which is formed with a series of teeth; a pair of links between which said teeth project in the closed position of the plates, said links being pivotally attached to the other of said plates; and a latch pivotally connected to an end of each of said links.

2. A tug consisting of a pair of curved plates hinged together, one of said plates being formed with a series of teeth; and a latch pivotally mounted on the other of said plates and formed with a pair of ears between which lies a nose adapted to engage said teeth to lock said plates together, said ears being cam-shaped and projecting beyond said nose to engage said toothed plate.

3. A tug consisting of a pair of curved plates hinged together, one of said plates being formed with a series of teeth; a pair of links between which lie said teeth in the closed position of the plates; a loop for the attachment of the tug to the harness; a hinge-pin which connects pivotally said loop, links and the other of said plates; and a latch pivotally connected to said links.

In testimony whereof I have hereunto set my hand this fourth day of September, 1907, at Dayton, Ohio, in the presence of the two undersigned witnesses.

CHESTER P. HATFIELD.

Witnesses:
 EDWARD A. GAY,
 ALFRED McCRAY.